United States Patent
Bogumil et al.

(10) Patent No.: US 8,637,202 B2
(45) Date of Patent: Jan. 28, 2014

(54) DEVICE TO MINIMIZE THE BUOYANCY DRIVEN FLOWS IN VERTICALLY ORIENTED HEADERS

(75) Inventors: Todd D. Bogumil, Rochester, NY (US); Steven D. Burch, Honeoye Falls, NY (US); Steven G. Goebel, Victor, NY (US); Eric J. Connor, Rochester, NY (US); Glenn W. Skala, Churchville, NY (US)

(73) Assignee: GM Global Technology Operations LLC, Detroit, MI (US)

(*) Notice: Subject to any disclaimer, the term of this patent is extended or adjusted under 35 U.S.C. 154(b) by 412 days.

(21) Appl. No.: 13/024,007

(22) Filed: Feb. 9, 2011

(65) Prior Publication Data

US 2012/0202132 A1    Aug. 9, 2012

(51) Int. Cl.
*H01M 8/04* (2006.01)
*H01M 8/24* (2006.01)

(52) U.S. Cl.
USPC .......................................... 429/458; 429/459

(58) Field of Classification Search
USPC .................................................. 429/458, 459
See application file for complete search history.

(56) References Cited

U.S. PATENT DOCUMENTS

| | | | |
|---|---|---|---|
| 6,242,118 B1* | 6/2001 | Grasso et al. | 429/428 |
| 6,632,556 B2* | 10/2003 | Guthrie et al. | 429/461 |
| 7,201,990 B2* | 4/2007 | Wariishi et al. | 429/415 |
| 7,816,050 B2* | 10/2010 | Farrington et al. | 429/459 |
| 2005/0064254 A1* | 3/2005 | Bourgeois | 429/18 |
| 2005/0084725 A1* | 4/2005 | Arthur et al. | 429/32 |
| 2008/0090130 A1* | 4/2008 | Ichikawa | 429/38 |
| 2008/0171253 A1 | 7/2008 | Owejan et al. | |
| 2010/0248066 A1* | 9/2010 | Frederiksen et al. | 429/458 |
| 2011/0223513 A1* | 9/2011 | Miller et al. | 429/458 |

* cited by examiner

*Primary Examiner* — Carlos Barcena
(74) *Attorney, Agent, or Firm* — Fraser Clemens Martin & Miller LLC; J. Douglas Miller

(57) ABSTRACT

A device for minimizing a buoyancy driven convective flow inside a manifold of a fuel cell stack includes a plurality of spaced apart baffle walls. The spaced apart baffle walls are configured to be disposed inside the manifold of the fuel cell stack. The spaced apart baffle walls increase a viscous resistance to the buoyancy driven convective flow inside the manifold.

19 Claims, 6 Drawing Sheets

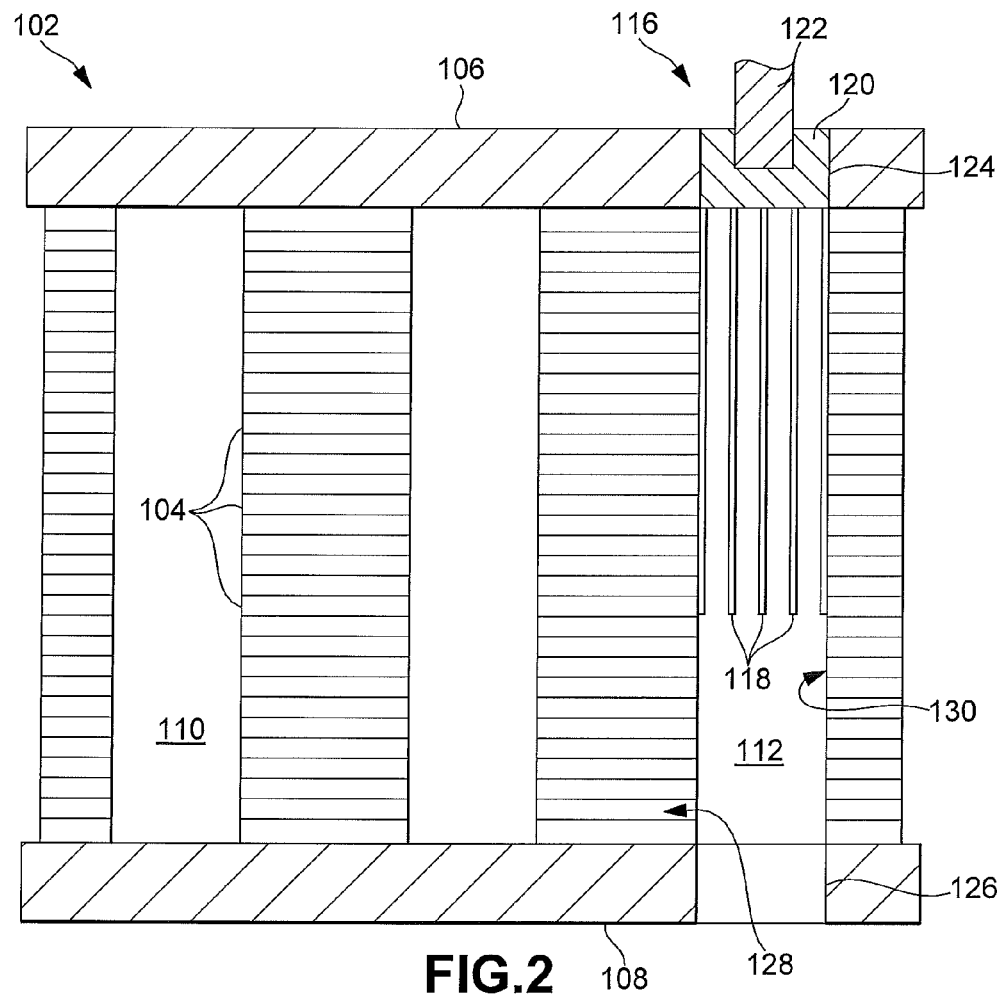
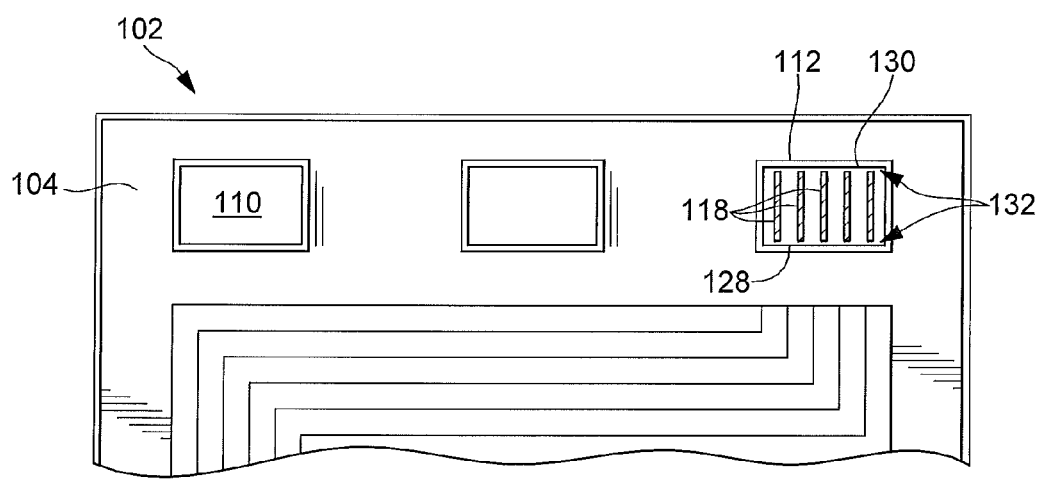

DEVICE TO MINIMIZE THE BUOYANCY DRIVEN FLOWS IN VERTICALLY ORIENTED HEADERS

FIELD OF THE INVENTION

The present disclosure relates to a fuel cell stack and, more particularly, to an insert device disposed in a header of the fuel cell stack.

BACKGROUND OF THE INVENTION

A fuel cell has been proposed as a clean, efficient and environmentally responsible power source for electric vehicles and various other applications. In particular, the fuel cell has been identified as a potential alternative to the traditional internal-combustion engine used in modern vehicles.

One type of fuel cell is known as a proton exchange membrane (PEM) fuel cell. The PEM fuel cell typically includes three basic components: a cathode, an anode, and an electrolyte membrane. The cathode and anode typically include a finely divided catalyst, such as platinum, supported on carbon particles and mixed with an ionomer. The electrolyte membrane is sandwiched between the cathode and the anode to form a membrane electrode assembly (MEA). The MEA is often disposed between porous diffusion media (DM) and fuel cell plates which facilitate a delivery of gaseous reactants, typically hydrogen and oxygen, for an electrochemical fuel cell reaction. Individual fuel cells can be stacked together in series to form a fuel cell stack capable of power a hydrogen fuel cell powered vehicle. An exemplary fuel cell stack is described in Assignee's co-pending U.S. patent application Ser. No. 11/622,492, the entire disclosure of which is hereby incorporated herein by reference.

As shown in FIG. 1, a known fuel cell stack 2 includes a plurality of fuel cells 4 disposed between a dry end unit 6 and a wet end unit 8. Each of the fuel cells 4 includes an MEA disposed between porous DM and a pair of fuel cell plates such as bipolar plates. The dry end unit 6 is generally disposed at a top or "dry end" of the known fuel cell stack 2, which is vertically oriented. The wet end unit 8 is disposed at a bottom or "wet end" of the known fuel cell stack 2. A first end of each of the fuel cells 4 has an inlet aperture formed in a header thereof for delivery of a gaseous reactant such as hydrogen or air to the fuel cells 4. The first end of the fuel cells 4 also has an outlet aperture formed in a header thereof for exhausting of an other gaseous reactant and reaction products such as water from the fuel cells 4. The inlet apertures cooperate to form an inlet manifold 10 of the known fuel cell stack 2. The outlet apertures cooperate to form an outlet manifold 12 of the known fuel cell stack 2. The fuel cells 4 may also have coolant apertures at the first end that cooperate to form a coolant manifold 11 for delivery or exhaust of coolant fluid from the fuel cells 4. It should be understood that a second end (not shown) of the fuel cell stack 2 also has apertures forming manifolds for exhaust of the gaseous reactant, delivery of the other gaseous reactant, and one of delivery or exhaust of the coolant fluid during operation of the fuel cell stack 2.

It has been observed that a temperature profile of the known fuel cell stack 2 after a shut-down operation includes lower temperatures adjacent the dry end unit 6 and the wet end unit 8. The temperature profile is due largely to thermal conduction from the known fuel cell stack at the dry end unit 6 and the wet end unit 8. The temperature profile causes a buoyancy driven free convection 14 within the inlet manifold 10 and the outlet manifold 12. The temperature profile and the buoyancy driven free convection 14 can lead to water evaporation and movement from warmer to cooler regions in the inlet manifold 10 and the outlet manifold 12, and condensation in the cooler regions. A collection of water at the cooler dry end of the known fuel cell stack 2 can lead to ice formation and blockage of fluid ports of the fuel cells 4 under freezing ambient conditions, and related issues during a start-up of the known fuel cell stack 2.

There is a continuing need for a device to minimize water accumulation at a dry end of the fuel cell stack transported by buoyancy driven convective flows inside the manifold of the fuel cell stack. Desirably, the device reduces a risk of reactant tunnel blockage due to ice formation during a shut-down of the fuel cell stack under freezing ambient conditions, and minimizes related issues during a start-up of the fuel cell stack.

SUMMARY OF THE INVENTION

In concordance with the instant disclosure, a device to minimize water accumulation at a dry end of the fuel cell stack transported by buoyancy driven convective flows inside the manifold of the fuel cell stack, reduce a risk of reactant tunnel blockage due to ice formation during a shut-down of the fuel cell stack under freezing ambient conditions, and minimize related issues during a start-up of the fuel cell stack, is surprisingly discovered.

In a first embodiment, a device for minimizing a buoyancy driven convective flow inside a manifold of a fuel cell stack includes a plurality of spaced apart baffle walls. The spaced apart baffle walls are configured to be disposed inside the manifold of the fuel cell stack. The spaced apart baffle walls are in direct fluid communication with the fuel cells and have a surface area sufficient to increase a viscous resistance to the buoyancy driven convective flow.

In another embodiment, a fuel cell stack includes a plurality of fuel cells disposed in a stack, and a manifold for one of delivering a fluid to the fuel cells and exhausting a fluid from the fuel cells. A device for minimizing buoyancy driven convective flow is disposed inside the manifold. The device includes a plurality of spaced apart baffle walls disposed inside the manifold of the fuel cell stack. The spaced apart baffle walls are in direct fluid communication with the fuel cells and have a surface area sufficient to increase a viscous resistance to the buoyancy driven convective flow.

In a further embodiment, a fuel cell stack includes a plurality of fuel cells disposed in a stack between a dry end unit and a wet end unit. The fuel cell stack also includes a manifold for exhausting a reactant and water from the fuel cells. The wet end has an exhaust aperture formed therein. The exhaust aperture is in communication with the manifold. A device for minimizing buoyancy driven convective flow includes a plurality of spaced apart baffle walls disposed inside the manifold of the fuel cell stack. The spaced apart baffle walls increase a viscous resistance to the buoyancy driven convective flow. The spaced apart baffle walls extend approximately half the distance between the dry end unit and the wet end unit. The spaced apart baffle walls are oriented substantially parallel with a direction of flow of the reactant and water from the fuel cells in order to minimize an affect on volumetric flow and/or flow resistance between the fuel cells and the exhaust aperture during an operation of the fuel cell stack.

DRAWINGS

The above, as well as other advantages of the present disclosure, will become readily apparent to those skilled in the art from the following detailed description, particularly when considered in the light of the drawings described herein.

FIG. 2 is a schematic cross-sectional side elevational view of one end of a fuel cell stack according to one embodiment of the present disclosure, illustrating a device disposed in a header of the fuel cell stack to minimize a buoyancy driven convective flow within the header;

FIG. 3 is a fragmentary top plan view partially in section of the fuel cell stack of FIG. 2, shown without a dry end unit;

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
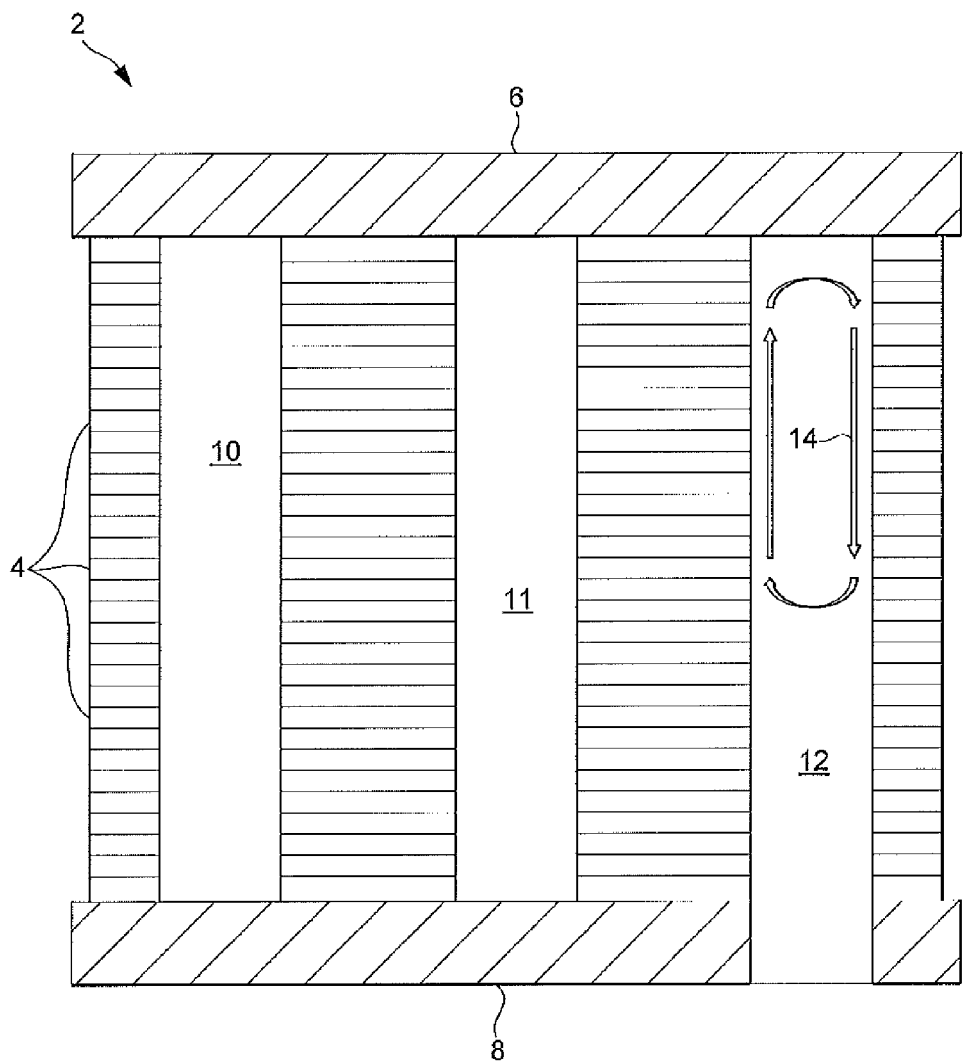
FIG. 1 is a schematic cross-sectional side elevational view of one end of a fuel cell stack of the prior art, illustrating a buoyancy driven convective flow within a header of the fuel cell stack.

For the purpose of clarity, related or like structure from FIG. 1 that is shown in FIGS. 2-7 has the same reference number as shown in FIG. 1, but in a 100-series, 200-series, 300-series, or 400-series, depending on the embodiment illustrated.

Referring now to FIGS. 2-3, a fuel cell stack 102 according to one embodiment of the present disclosure having a plurality of fuel cells 104 disposed between a dry end unit 106 and a wet end unit 108 is shown. Each of the fuel cells 104 may include an MEA disposed between porous DM and a pair of fuel cell plates such as bipolar plates, for example. The dry end unit 106 is generally disposed at a top or "dry end" of the fuel cell stack 102. The fuel cell stack 102 may be substantially vertically oriented, for example. The wet end unit 108 is disposed at a bottom or "wet end" of the fuel cell stack 2. Each of the fuel cells 104 has an inlet aperture formed in a header thereof for delivery of a gaseous reactant such as hydrogen or air to the fuel cells 104. Each of the fuel cells 104 also has an outlet aperture formed in a header thereof for exhausting of the gaseous reactant and reaction products such as water from the fuel cells 104. The inlet apertures cooperate to form an inlet manifold 110 of the fuel cell stack 102. The outlet apertures cooperate to form an outlet manifold 112 of the fuel cell stack 102.

The fuel cell stack 102 includes a device 116 for minimizing a buoyancy driven convective flow inside a manifold 112 of a fuel cell stack 102. The device 116 is disposed in at least one manifold 110, 112 of the fuel cell stack 102. Although the device 116 is shown inside the manifold 112, it should be appreciated that the device 116 may alternatively, or in addition, be disposed inside the manifold 110, as desired.

The device 116 includes a plurality of spaced apart baffle walls 118. The spaced apart baffle walls 118 may be substantially vertically oriented in the manifold 112, particularly when the fuel cell stack 102 is vertically oriented. The spaced apart baffle walls 118 are configured to increase a viscous resistance to the buoyancy driven convective flow that would normally result in the fuel cell stack 102 following a shut-down operation. It should be understood that the baffle walls 118 increase a surface area across which a fluid such as a reactant in the manifold 112 must flow, thereby leading to the increase in the viscous resistance of the fluid. The spacing, texturing, dimensions, orientation, and number of the baffle walls 118 may be selected to provide a viscous resistance equal to or greater than an estimated buoyancy force of the convective flow, and thereby minimize or eliminate the buoyancy driven convective flow in the manifold 112 of the fuel cell stack 102 following the shut-down operation.

In the particular embodiment illustrated in FIGS. 2-3, the device 116 includes a securing body 120. The plurality of spaced apart baffle walls 118 depend from the securing body 120. The device 116 may also include a handle 122. The handle 122 is connected to the securing body 120 and may be used to insert the spaced apart baffle walls 118 inside the manifold 112.

Illustratively, the device 116 may be placed adjacent the dry end of the fuel cell stack 102, where an opportunity for drainage of accumulate water is less than at the wet end of the fuel cell stack 102. Where the fuel cell stack 102 includes a dry end unit 106 and a wet end unit 108, the dry end unit 106 may have a first aperture 124 formed therein and the wet end unit 108 may have a second aperture 126 formed therein. Where the manifold 112 is an exhaust manifold, the second aperture 126 may be an exhaust aperture for exhausting excess reactants and byproducts such as water from the fuel cell stack 102.

The device 116 may be sealingly disposed in the first aperture 124. The securing body 120 may snap fit into dry end unit 106, and thereby seal the first aperture 124, for example. In another example, the securing body 120 may be bolted to the dry end unit 106. Other suitable means for affixing the securing body 120 to the dry end unit 106 may also be used within the scope of the present disclosure.

In operation, the securing body 120 militates against a lateral movement of the spaced apart baffle walls 118 inside the manifold 112, which may result in undesirable contact between at least one of the baffle walls 118 and the fuel cells 104. Alternatively, the device 116 may be integrally formed with the dry end unit 106, and the spaced apart baffle walls 118 may depend from the dry end unit 106. The spaced apart baffle walls 118 are sufficiently rigid to militate against the lateral movement. A skilled artisan should appreciate that other means for inserting the device 116 into the manifold 112, and militating against the lateral movement of the spaced apart baffle walls 118, may also be employed, as desired.

Referring to FIG. 2, the manifold 112 of the fuel cell stack 102 may have an inboard surface 128 and an outboard surface 130. The inboard surface 128 may have a plurality of fluid ports or reactant tunnels (not shown) that provide fluid communication between the fuel cells 104 and the manifold 112. The spaced apart baffle walls 118 of the device 116 disposed within the manifold 112 do not contact the inboard surface 128 and the outboard surface 130. A gap 132 exists between the spaced apart baffle walls 118 and each of the inboard surface 128 and the outboard surface 130 of the manifold 112. In addition to selecting the rigidity of the baffle walls 118, the gap 132 may be selected to militate against the lateral movement of the baffle walls 118 in operation.

Although the baffle walls 118 of the device 116 may extend substantially an entire length of the manifold 112, it should be understood that the baffle walls 118 may advantageously extend only a portion of the entire length of the manifold 112 adjacent the dry end of the fuel cell stack 102. Where the baffle walls 118 do not extend the entire length of the manifold, but are at least disposed adjacent the dry end of the fuel cell stack, both a minimization of the buoyancy driven convective flow and a reduction in thermal mass of the fuel cell stack 102 can be accomplished. For example, the spaced apart baffle walls 118 may extend into the manifold 112 a distance less than a distance between the dry end unit 106 and the wet end unit 108. In a particular embodiment, the spaced apart baffle walls 118 extend a distance equal to approximately half the distance between the dry end unit 106 and the wet end unit 108. Other lengths for the spaced apart baffle walls 118 may be employed, as desired.

Figure 4A:
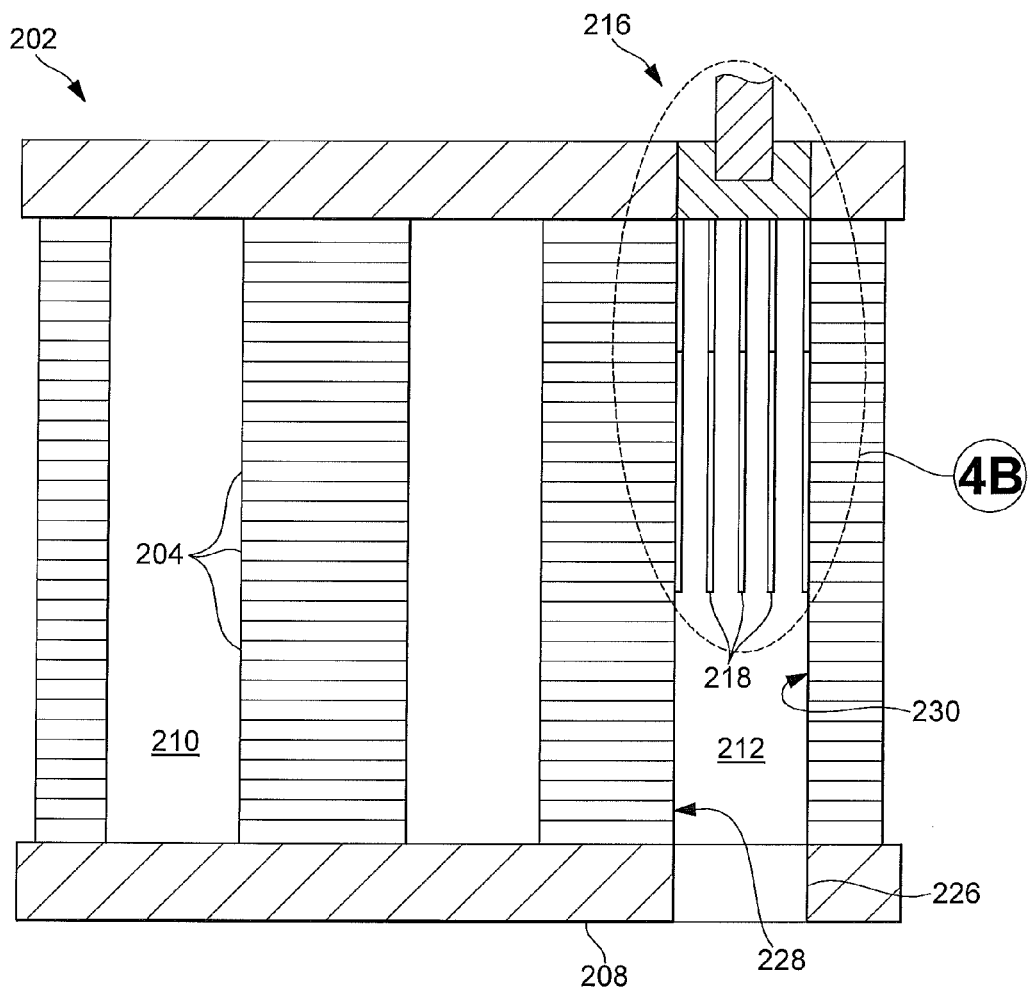
FIG. 4A is a schematic cross-sectional side elevational view of a fuel cell stack according to another embodiment of the present disclosure, illustrating a device with a tapered end portion disposed in a header of the fuel cell stack to minimize a buoyancy driven convective flow within the header.
Figure 4B:
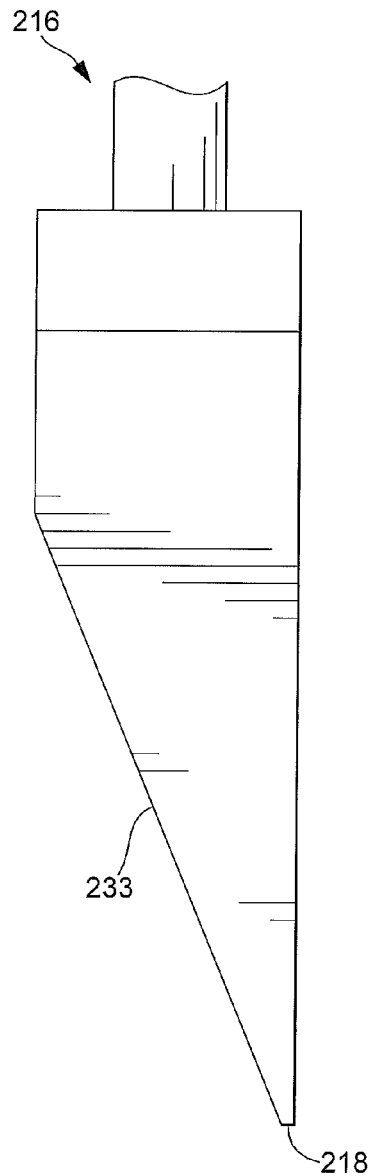
FIG. 4B is a fragmentary side elevational view of the device with the tapered end portion shown in FIG. 4A.

In another embodiment shown in FIGS. 4A and 4B, each of the spaced apart baffle walls 218 of the device 216 may have a tapered or beveled lower portion 233. For example, each of the spaced apart baffle walls 218 may increase in length in a direction from the inboard surface 228 to the outboard surface 230 of the manifold 212 of the fuel cell stack 202. Water accumulating on the spaced apart baffle walls 218 may drip from the spaced apart baffle walls 218, and in this case will be directed away from the inboard surface 228 toward the outboard surface 230. The accumulating water is eventually drained from the fuel cell stack 204 at the second aperture 226 formed in the wet end unit 208. It should be therefore be understood that the beveling of the spaced apart baffle walls 218 away from the inboard surface 228 of the fuel cells 204 will militate against an undesirable accumulation of water, and ice formation under freezing ambient conditions, at the fluid ports disposed at the inboard surface 228.

Figure 5B:
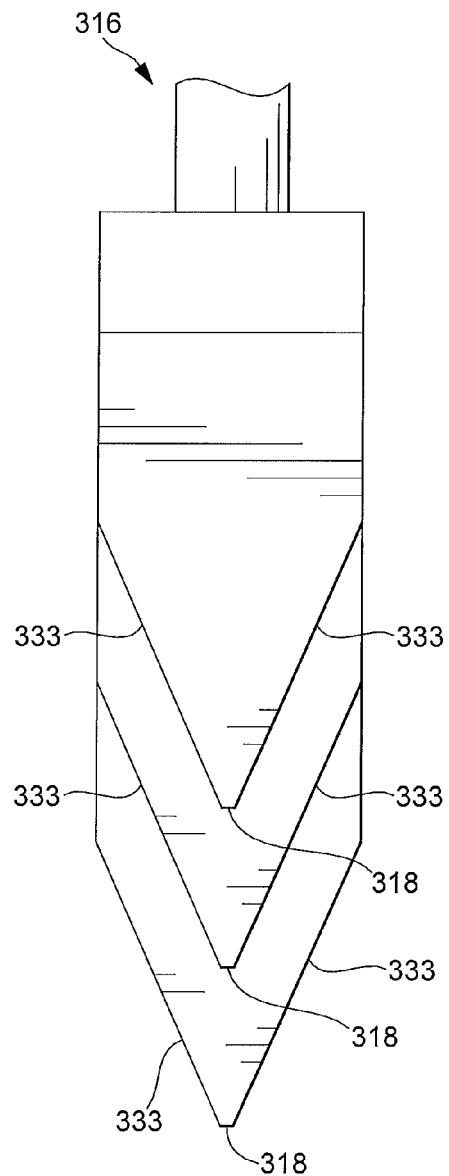
FIG. 5B is a fragmentary side elevational view of the device with the dual tapered end portion shown in FIG. 5A.
Figure 5A:
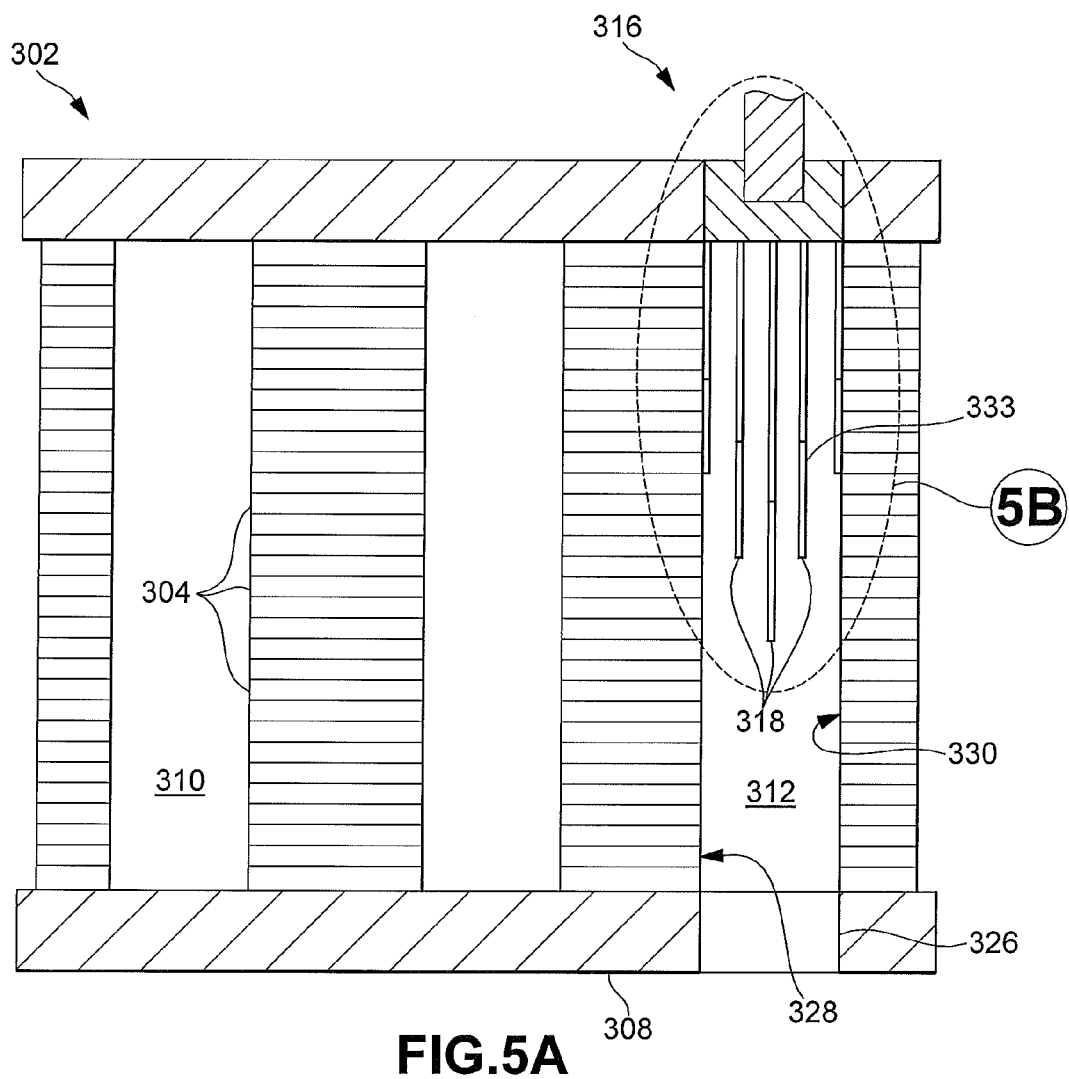
FIG. 5A is a schematic cross-sectional side elevational view of a fuel cell stack according to a further embodiment of the present disclosure, illustrating a device with a dual tapered end portion disposed in a header of the fuel cell stack to minimize a buoyancy driven convective flow within the header.

In a further embodiment shown in FIGS. 5A and 5B, at least one of the spaced apart baffle walls 318 may have a length greater than a remaining portion of the spaced apart baffle walls 318. The spaced apart baffle walls 318 may also have the beveled lower portions 333 in order to cause the baffle walls 318 to terminate at a lateral center of the manifold 312. For example, a lower end of the device 316 may have a dual tapered shape. The longest of the spaced apart baffle walls 318 may be disposed adjacent the lateral center of the manifold 312. The longest of the spaced apart baffle walls 318 may also terminate approximately halfway between the inboard surface 328 and the outboard surface 330, for example. Water accumulating on the spaced apart baffle walls 318 may drip wall-to-wall, and in this case will be directed away from both the inboard surface 328 and the outboard surface 330 toward the lateral center of the manifold 312. The accumulating water is eventually drained from the fuel cell stack 304 at the second aperture 326 formed in the wet end unit 308. It should therefore be understood that the longest of the spaced apart baffle walls 318 being disposed in the lateral center of the manifold 312 will militate against an undesirable accumulation of water, and ice formation under freezing ambient conditions, at the fluid ports disposed at the inboard surface 228.

Figure 6:
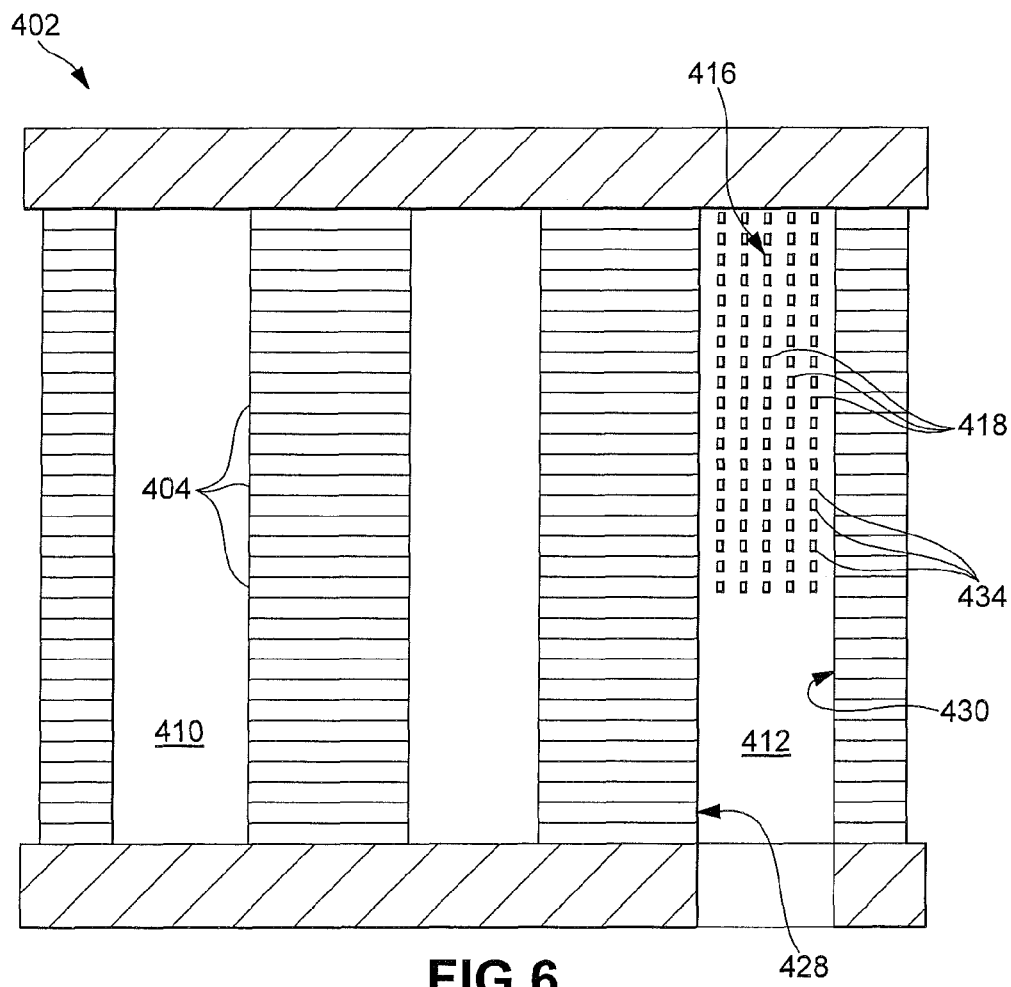
FIG. 6 is a schematic cross-sectional side elevational view of a fuel cell stack according to an alternative embodiment of the present disclosure, illustrating a device disposed in a header of the fuel cell stack to minimize a buoyancy driven convective flow within the header.
Figure 7:
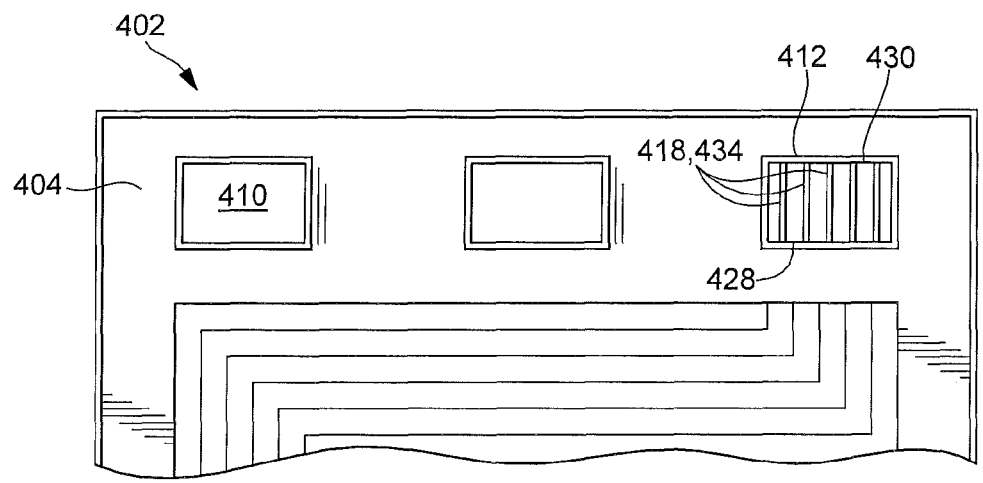
FIG. 7 is a fragmentary top plan view partially of the fuel cell stack of FIG. 6, shown without a dry end unit.

In an alternative embodiment shown in FIGS. 6 and 7, each of the spaced apart baffle walls 418 is formed from a plurality of baffle wall segments 434. The baffle wall segments 434 are integral with at least a portion of the plurality of fuel cells 404. For example, the baffle wall segments 434 may be formed from at least one of a fuel cell plate and a subgasket of each of the fuel cells 404. Illustratively, the baffle wall segments 434 may be strips of material disposed across the apertures formed in at least one of the fuel cell plate and the subgasket of each of the fuel cells 404. The strips may be integral with the fuel cell 404 or separately adhered materials, as desired. The strips extend across the apertures from the inboard side 428 of the manifold 412 to the outboard side 430 of the manifold. The strips are aligned and form an offset lattice-like structure when the fuel cell stack 402 is assembled. In particular, the baffle wall segments 434 form the baffle walls 418 when the portion of the fuel cells 404 having the baffle wall segments 434 are disposed in the stack.

With renewed reference to FIGS. 3 and 7, one of ordinary skill in the art should understand that the spaced apart baffle walls 118, 218, 318, 418 of the present disclosure may be oriented to minimize an effect on the volumetric flow during operation of the fuel cell stack 102, 202, 302, 402. In particular, the spaced apart baffle walls 118, 218, 318, 418 may be oriented substantially parallel with a direction of fluid flow either to the fuel cells 104, 204, 304, 404, in the case of an inlet manifold, or from the fuel cells, in the case of an outlet manifold, in order to minimize the effect on volumetric flow between the fuel cells 104, 204, 304, 404 and the manifold 112, 212, 312, 412 during operation. That is, the spaced apart baffle walls 118, 218, 318, 418 may be oriented substantially parallel with an elongate axis of the inlet manifold 110, 210, 310, 410 or an outlet manifold 112, 212, 312, 412 of the fuel cell stack 102, 202, 302, 402. Other suitable orientations of the spaced apart baffle walls 118, 218, 318, 418 for balancing volumetric flow during operation with minimizing buoyancy driven connective flow after shut-down may be used, as desired.

Advantageously, the device 116, 216, 316, 416 with the spaced apart baffle walls 118, 218, 318, 418 of the present disclosure militates against the buoyancy driven convective flow in the manifold 112, 212, 312, 412 after the shut-down operation of the fuel cell stack 102, 202, 302, 402, which is known to result due to the temperature profile of the post-operation fuel cell stack 102, 202, 302, 402. The device 116, 216, 316, 416 thereby minimizes water accumulation at the dry end of the fuel cell stack 102, 202, 302, 402, which is normally transported by the buoyancy driven convective flow. A risk of reactant tunnel blockage due to ice formation during the shut-down of the 102, 202, 302, 402, under freezing ambient conditions, is also reduced by minimizing the water accumulation. Subsequent issues during a start-up of the fuel cell stack, related to blockage of fluid ports or reactant tunnels by ice or accumulated water, are likewise minimized.

While certain representative embodiments and details have been shown for purposes of illustrating the invention, it will be apparent to those skilled in the art that various changes may be made without departing from the scope of the disclosure, which is further described in the following appended claims.

What is claimed is:

1. A device for minimizing a buoyancy driven convective flow inside a manifold of a fuel cell stack having a dry end unit, the fuel cell stack having a plurality of fuel cells disposed in a stack, comprising:

a plurality of spaced apart baffle walls disposed inside the manifold of the fuel cell stack and substantially parallel to an elongate axis of the manifold, the spaced apart baffle walls disposed adjacent the dry end unit of the fuel cell stack in direct fluid communication with the fuel cells but not in physical contact with the fuel cells and having a surface area sufficient to increase a viscous resistance to the buoyancy driven convective flow of gases.

2. The device of claim 1, further comprising a securing body having the plurality of spaced apart baffle walls depending therefrom.

3. The device of claim 2, further comprising a handle connected to the securing body for inserting the spaced apart baffle walls inside the manifold.

4. The device of claim 1, wherein each of the spaced apart baffle walls has a different length.

5. A fuel cell stack, comprising:
   a plurality of fuel cells disposed in a stack, the stack having a dry end unit;
   a manifold for one of delivering a fluid to the fuel cells and exhausting a fluid from the fuel cells; and
   a device for minimizing a buoyancy driven convective flow inside the manifold, the device including a plurality of spaced apart baffle walls disposed inside the manifold of the fuel cell stack and substantially parallel to an elongate axis of the manifold, the spaced apart baffle walls disposed adjacent the dry end unit of the fuel cell stack in direct fluid communication with the fuel cells but not in physical contact with the fuel cells and having a surface area sufficient to increase a viscous resistance to the buoyancy driven convective flow of gases.

6. The fuel cell stack of claim 5, wherein the fuel cell stack includes a wet end unit.

7. The fuel cell stack of claim 6, wherein the spaced apart baffle walls depend from the dry end unit.

8. The fuel cell stack of claim 6, wherein the dry end unit has a first aperture formed therein, the aperture in communication with the manifold.

9. The fuel cell stack of claim 8, wherein the device includes a securing body sealingly disposed in the first aperture, the plurality of spaced apart baffle walls depending from the securing body.

10. The fuel cell stack of claim 9, wherein the device includes a handle connected to the securing body for inserting the spaced apart baffle walls inside the manifold.

11. The fuel cell stack of claim 6, wherein the wet end includes a second aperture formed therein, the second aperture in communication with the manifold.

12. The fuel cell stack of claim 11, wherein the spaced apart baffle walls extend a distance less than a length of the manifold between the dry end unit and the wet end unit.

13. The fuel cell stack of claim 12, wherein the spaced apart baffle walls extend a distance equal to approximately half the distance between the dry end unit and the wet end unit.

14. The fuel cell stack of claim 5, wherein each of the spaced apart baffle walls is formed from a plurality of baffle wall segments integral with at least a portion of the plurality of fuel cells, the baffle wall segments forming the baffle walls when the fuel cells are disposed in the stack.

15. The fuel cell stack of claim 14, wherein the baffle wall segments have an offset lattice-like structure.

16. The fuel cell stack of claim 5, wherein the manifold has an inboard surface and an outboard surface, and wherein a gap is formed between the spaced apart baffle walls and each of the inboard surface and the outboard surface of the manifold.

17. The fuel cell stack of claim 16, wherein the spaced apart baffle walls each have a beveled lower portion, each of the spaced apart baffle walls increasing in length in a direction from the inboard surface to the outboard surface of the manifold.

18. The device of claim 17, wherein at least one of the spaced apart baffle walls adjacent a lateral center of the manifold and between the inboard surface and the outboard surface has a length greater than a remaining portion of the spaced apart baffle walls.

19. A fuel cell stack, comprising:
   a plurality of fuel cells disposed in a stack between a dry end unit and a wet end unit;
   a manifold for exhausting a reactant and water from the fuel cells, the wet end including an exhaust aperture formed therein, the exhaust aperture in communication with the manifold; and
   a device for minimizing a buoyancy driven convective flow inside the manifold, the device including a plurality of spaced apart baffle walls disposed inside the manifold of the fuel cell stack and substantially parallel to an elongate axis of the manifold, spaced apart baffle walls in direct fluid communication with the fuel cells but not in physical contact with the fuel cells and having a surface area sufficient to increase a viscous resistance to the buoyancy driven convective flow of gases, the spaced apart baffle walls disposed adjacent the dry end unit and extending approximately half the distance between the dry end unit and the wet end unit, and the spaced apart baffle walls oriented to minimize an effect on volumetric flow between the fuel cells and the exhaust aperture during an operation of the fuel cell stack.

* * * * *